May 7, 1946.    S. Y. WHITE    2,399,702
SPACING DEVICE FOR ADJUSTING TO CLOSE LIMITS
Original Filed April 18, 1942    8 Sheets-Sheet 1

INVENTOR.
Sidney Y. White
BY Moses, Nolte, Crews + Berry
ATTORNEYS

May 7, 1946.   S. Y. WHITE   2,399,702
SPACING DEVICE FOR ADJUSTING TO CLOSE LIMITS
Original Filed April 18, 1942   8 Sheets-Sheet 2
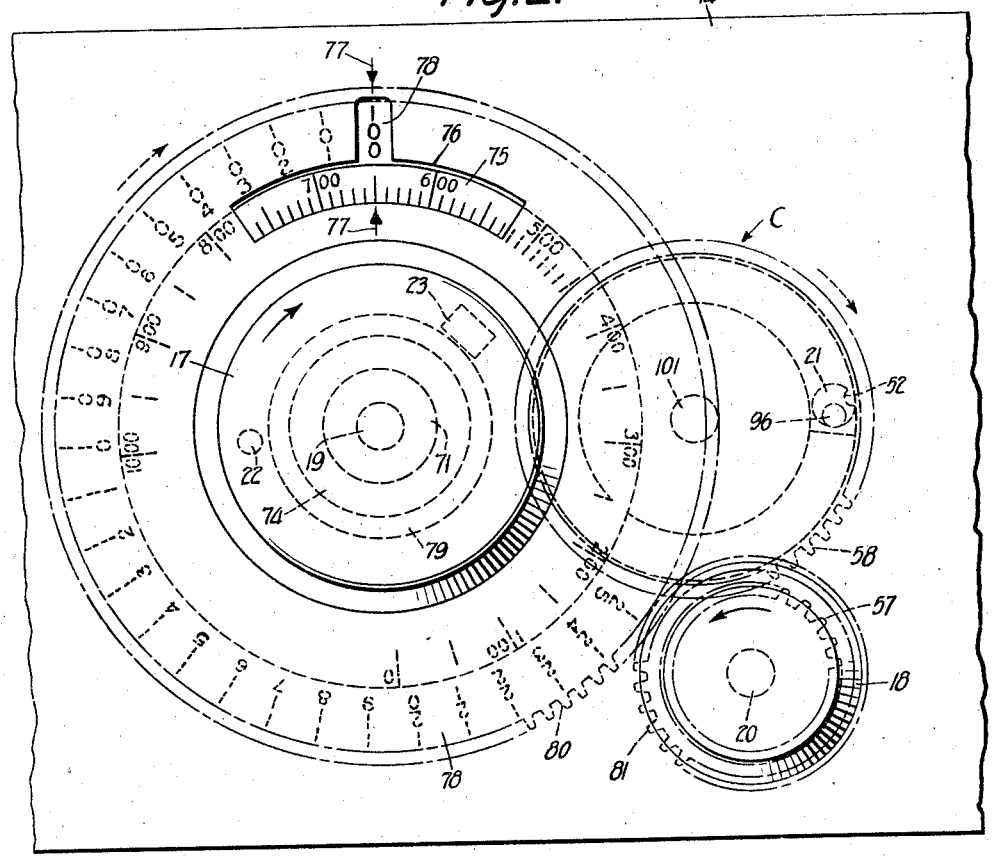
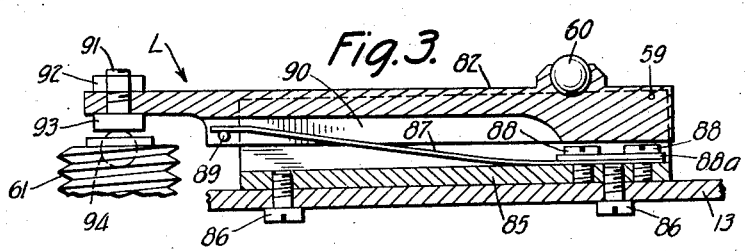
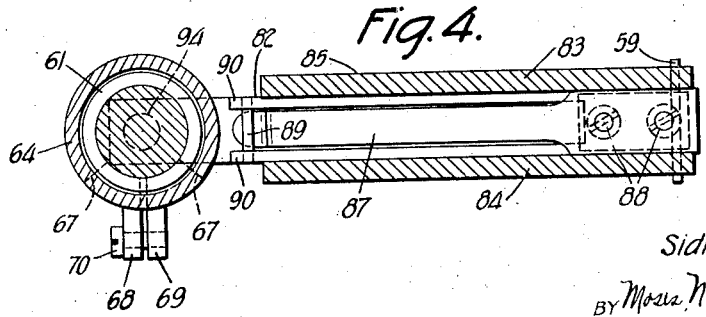
INVENTOR.
Sidney Y. White
BY Moser, Nolte, Crews & Berry
ATTORNEYS May 7, 1946.    S. Y. WHITE    2,399,702
SPACING DEVICE FOR ADJUSTING TO CLOSE LIMITS
Original Filed April 18, 1942    8 Sheets-Sheet 4
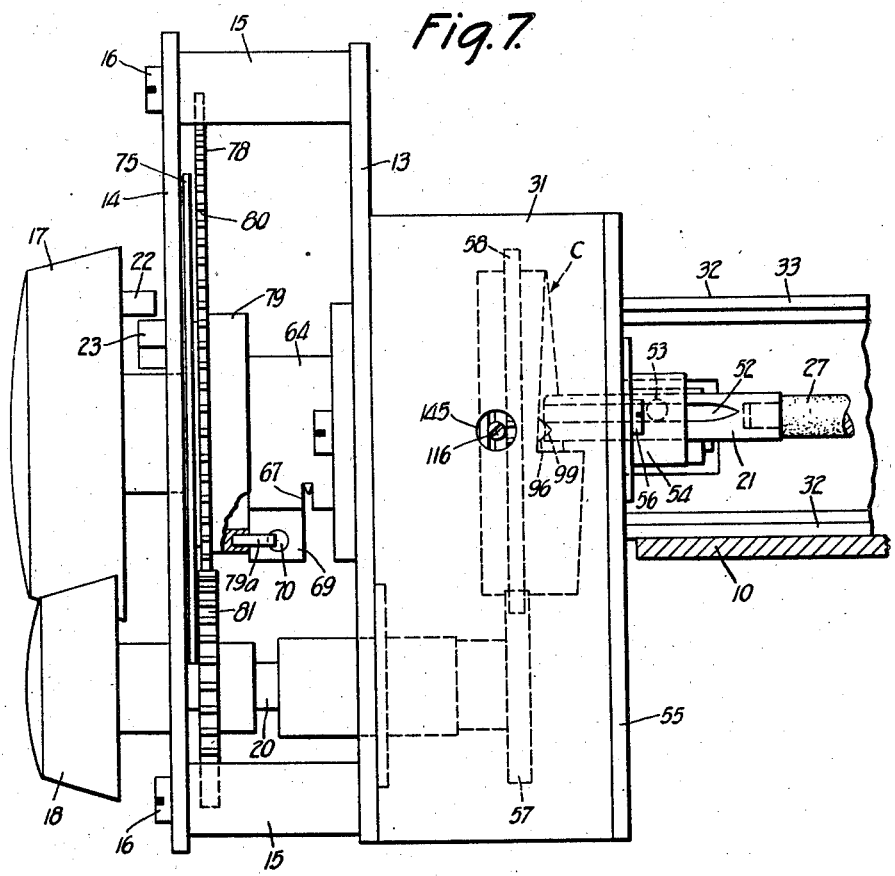
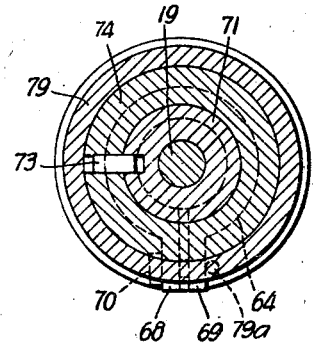
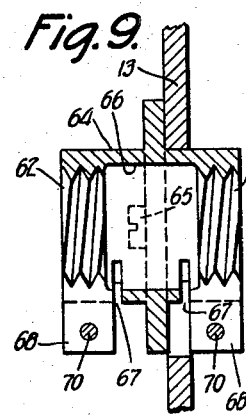
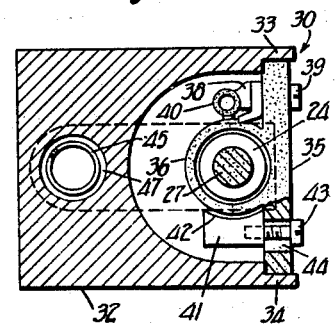
INVENTOR.
Sidney Y. White
BY Moses, Nolte, Crews & Berry
ATTORNEYS

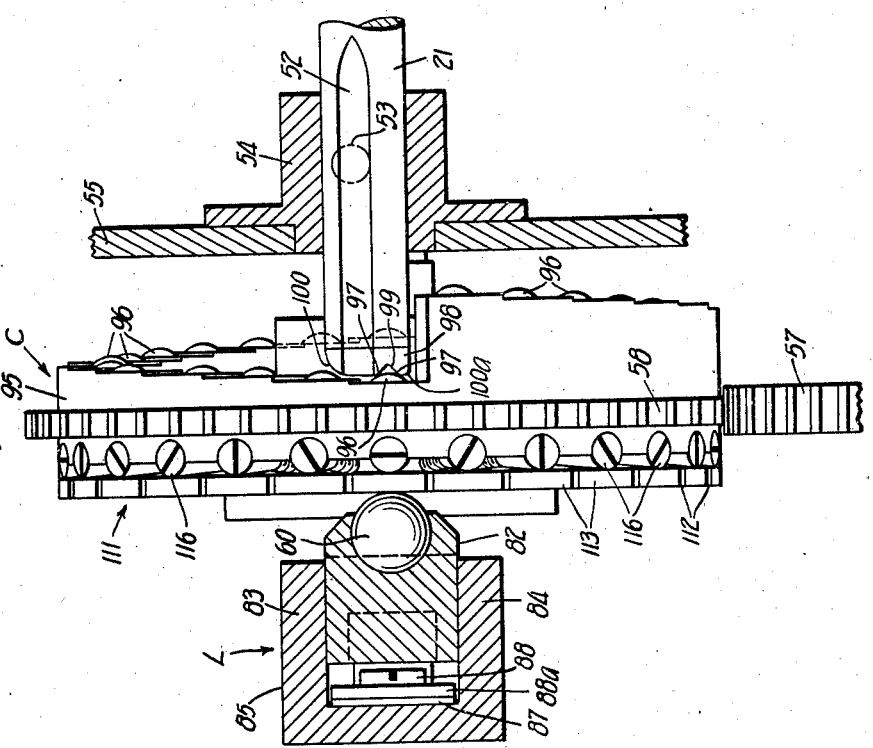
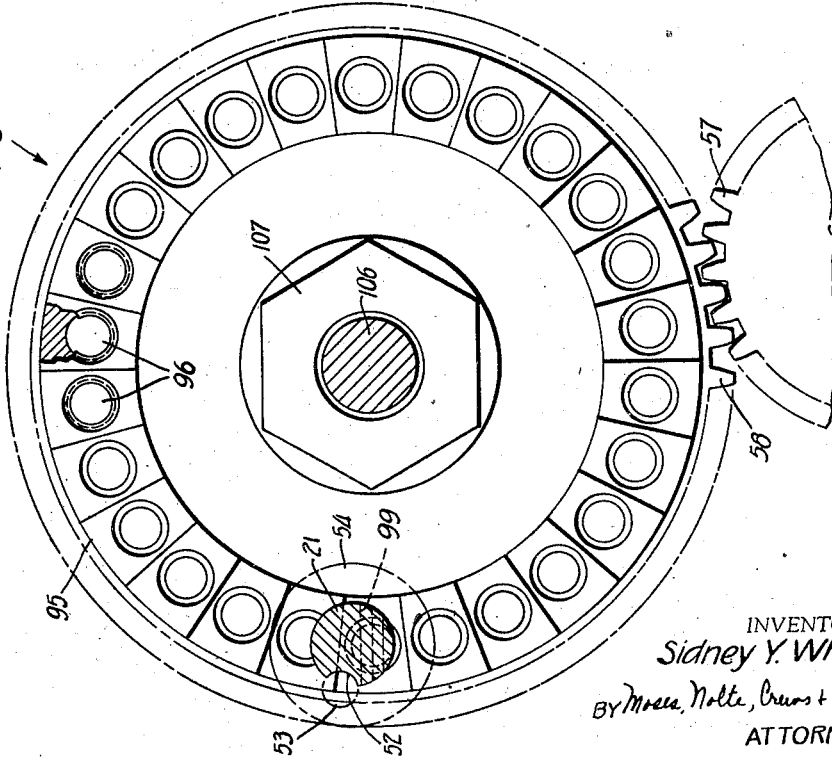

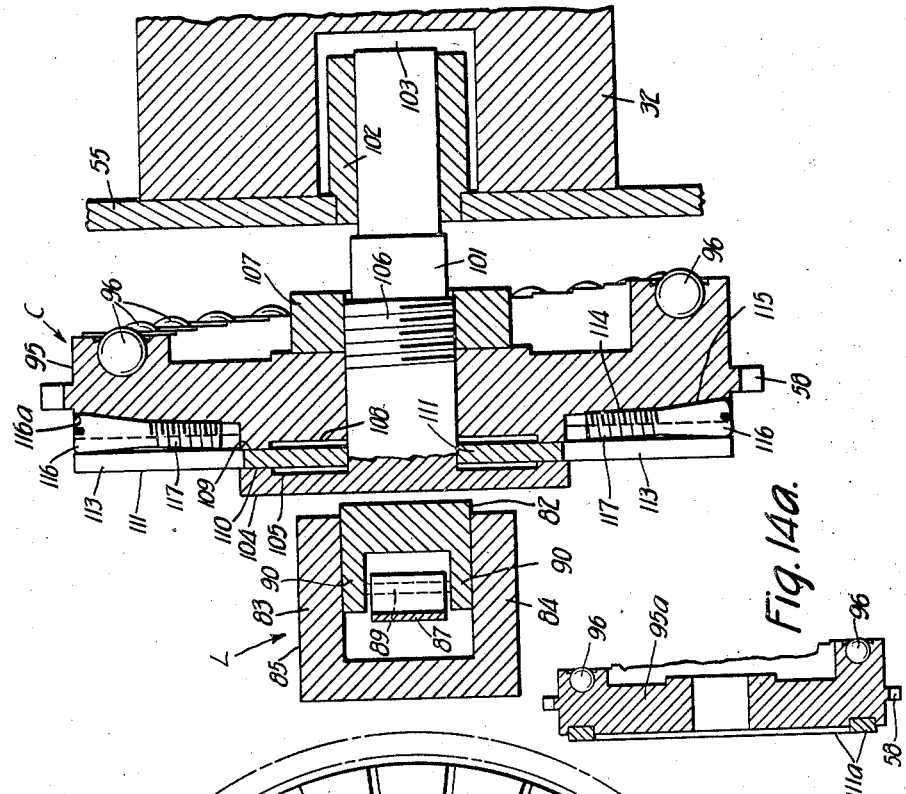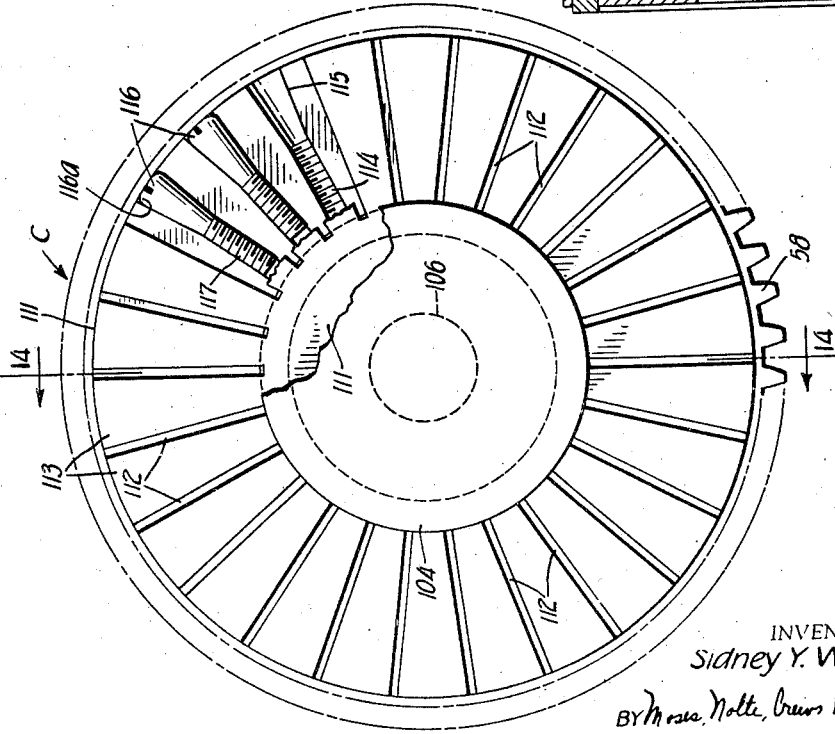

May 7, 1946. S. Y. WHITE 2,399,702
SPACING DEVICE FOR ADJUSTING TO CLOSE LIMITS
Original Filed April 18, 1942 8 Sheets-Sheet 7
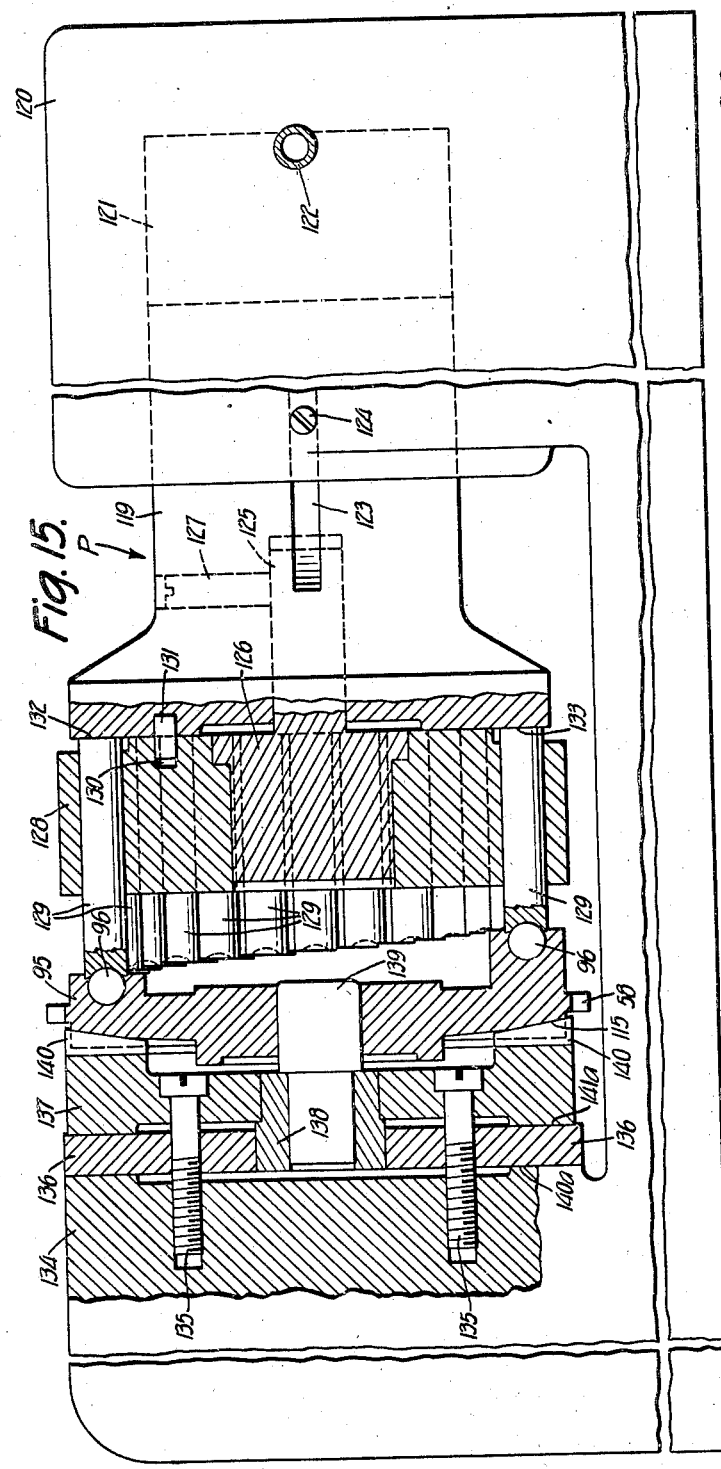
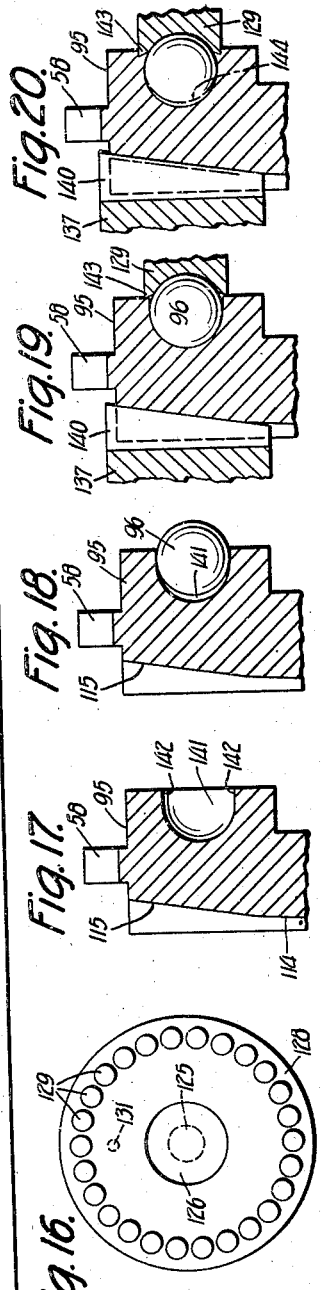
INVENTOR.
Sidney Y. White
BY *Moser, Nolte, Crews & Berry*
ATTORNEYS

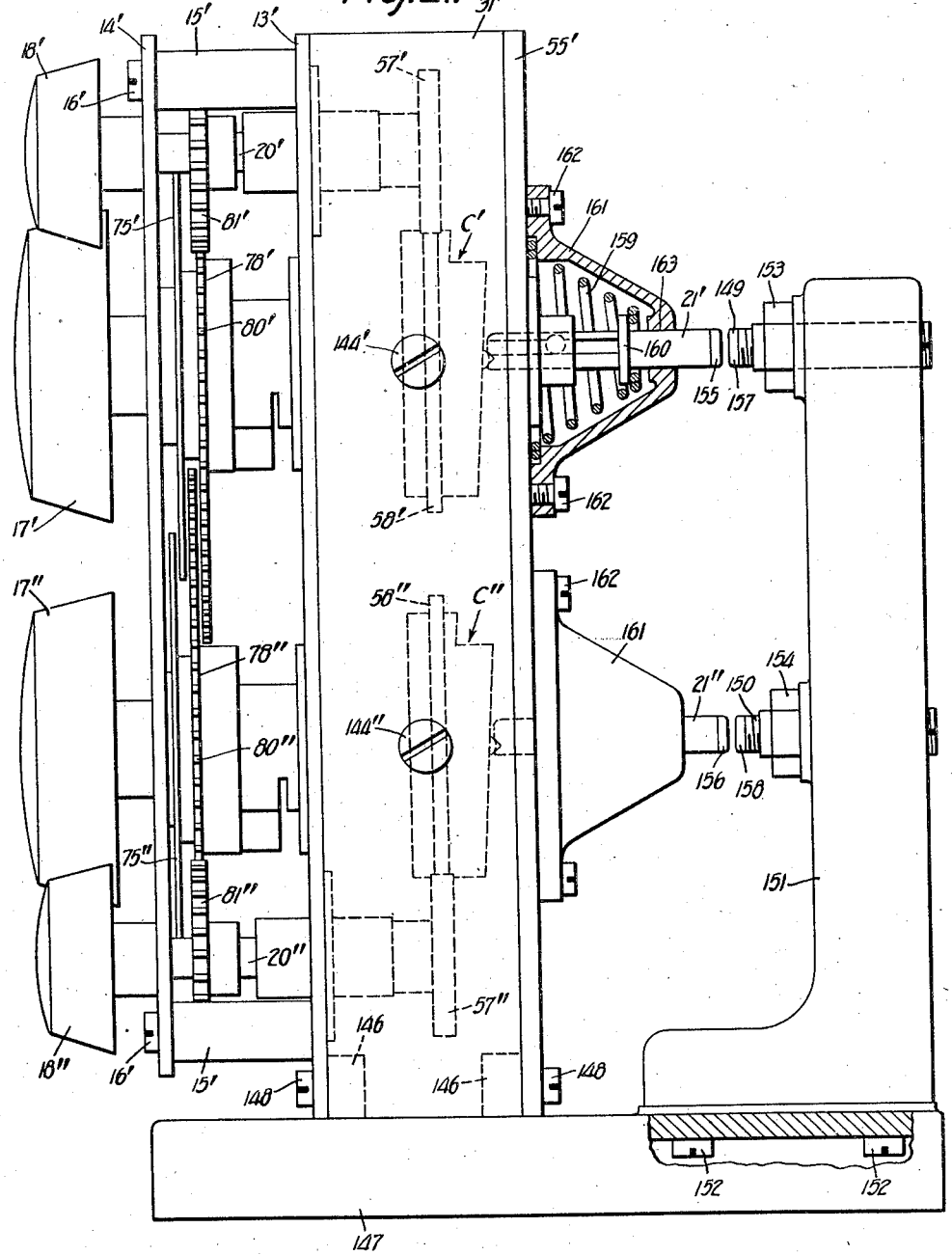

Patented May 7, 1946

2,399,702

UNITED STATES PATENT OFFICE 2,399,702

SPACING DEVICE FOR ADJUSTING TO CLOSE LIMITS

Sidney Y. White, Wilmette, Ill., assignor to Victor S. Johnson, Chicago, Ill.; Alex Thomson administrator of said Victor S. Johnson, deceased Original application April 18, 1942, Serial No. 439,509. Divided and this application March 10, 1944, Serial No. 525,886

4 Claims. (Cl. 74—568)

The present application is a division of my pending application, Serial No. 439,509, filed April 18, 1942, for "Device for adjusting or tuning to close limits."

In said prior application, disclosure is made of an operated member adapted for adjustment to close limits. The operated member is illustratively disclosed in one form of embodiment as the tuning means for tuning a radio circuit, and in another form of embodiment as an adjustable gage block of a gage for measuring the dimensions of an article.

The invention of said prior application is not limited, however, to such illustrative uses, but is of general utility for adjusting an operated member whenever an adjustment of such member to close limits is desired.

For the adjustment of such an operated member in accordance with the disclosure of said pending application, provision is made of an operating member having a limited range of movement which is desirably continuous and finely graduated, and a spacing member interposed between the operating and operated members. The spacing member is arranged to displace the operated member to different mechanically determined positions according to its setting relative to the operating member for any given position of the latter so that the operated member may, for any of its positions as determined by the setting of the spacing member, be moved through a selected, limited range of movement by the operating member.

In accordance with a practical and highly advantageous form of said invention, the spacing member is provided with a plurality of steps adapted to impart successive steps of movement to the operated member, said movements being of predetermined extent and equal to one another, and also equal or substantially equal to the limited range of movement of the operating member. Such relationship is not necessary, however, for the practice of the invention, and it will be understood that for certain purposes the several steps of the spacing member may be unequal and also that the limited amount of movement imparted to the operated member by the actuation of the operating member may be more or less than any one step of movement imparted to the operated member in response to the movement of the spacing member.

There is further provided in association with each of such operating and spacing members a dial device, the reading of the dial associated with the operating member indicating the setting of the operated member due to its displacement by the operating member and the reading of the dial associated with the spacing member indicating the setting of the operated member due to its displacement by the spacing member. The sum of the readings of the two dials indicates the setting of the operated member resulting from its displacement by both the operating and spacing members in any case where both the latter members are operated. The described dial arrangement provides a very extensive effective dial surface yet at the same time takes up only a small amount of space, is easily read and is inexpensive to manufacture. Further advantages of such a dual dial arrangement will become apparent as its application for indicating the setting of a radio receiver is described.

No claim is made herein to the combination structure, the present application being directed to novel features of the spacing device per se.

Objects of the present invention have to do with the provision of a spacing device which can be made to produce mechanically determined steps of operation of the operated member of precisely established magnitude, the device being of such construction that it can be made economically and will be durable and dependable in use.

Claims directed to novel combinations, in radio tuning apparatus and in gages are included in my parent application referred to above; and in another divisional application executed concurrently herewith and entitled "Gages."

In alloting station frequencies in radio broadcasting, it is the custom in this country to space the stations 10 kc. apart so that if stations were similarly separated in the ultra-high frequency spectrum, 2,500 stations would be passed through in tuning a receiver through the frequency range of 100 to 125 megacycles. For indicating the tuning of the receiver by means of a dial mechanically connected to the tuning means, it has been found that dial divisions spaced 0.1 inch apart are easy to read and are spaced far enough apart so that adjustment from one dial division to the next may be made to tune the receiver to the next adjacent station. Tuning through the 2,500 stations would therefore require 2,500 dial divisions spaced 0.1 inch apart or a total dial length of 250 inches, which would require a single dial having a diameter of approximately 80 inches. Such a dial is obviously commercially impractical on account of its large size, weight and cost. It is one of the main objects of the present invention to provide an easy reading dial arrangement in which a pair of dials of only 4 inches in diameter provide the equivalent of approximately 25 ft. of dial length. In the preferred embodiment of the invention, the two dials are concentrically mounted for rotation about a common axis so that the entire adjusting and indicating unit may be made very compact and light in weight, the entire unit occupying only about 8 cubic inches of space. Furthermore, its component parts are so constructed that while it provides precise adjustment of the tuning instrumentality or other driven member throughout its full range of adjustment, yet its cost of production is so low that its use is not restricted to expensive measuring or radio apparatus designed for laboratory use only. On the other hand the device is especially adapted for use in tuning mobile radio equipment such as radio receivers for use in airplanes, boats, automobiles, etc., where the equipment is subjected to considerable vibration and wide variations in temperature and humidity and where its energizing current is apt to be supplied by dry batteries whose voltage gradually decreases with use.

It has been found that a resonant circuit comprising a stationary coil and condenser may be tuned over the range of 100 to 125 megacycles by means of a compressed powdered iron core which is supported for longitudinal adjustment along the axis of the coil and that by suitable choice of the circuit constants, a linear relation exists between the dial adjustment and the resonant frequency of the circuit. It was found that a motion of the core of 0.250 inch is sufficient to tune the circuit through the entire frequency range of 25 megacycles or 2,500 stations. In the illustrated embodiment of the invention, the iron core is mounted on a push rod which is actuated by a lever from a point near its fulcrum, the outer end of the lever being rocked by a coarse pitch screw which carries a dial continuously calibrated over approximately 270° of its periphery from 0 to 1,000 kc. The pitch of the screw and the lengths of the lever arms are such that the iron core is advanced a distance of 0.010 inch for a rotation of the dial of 270°. Each division of the dial may desirably be made to represent a displacement of the iron core by an amount of .0001 inch or an amount sufficient to tune the circuit to the next station (10 kc.). A rotation of this continuous dial from 0 to 1,000 thus tunes the circuit over the 100 stations between 100 and 101 megacycles, the station frequency above 100 megacycles being read directly on the dial in kc. The initial frequency of 100 megacycles is indicated on a second dial provided immediately adjacent the first dial and hereinafter described. By using a coarse pitch screw and rotating it through less than one revolution, the backlash and inaccuracy resulting from the use of a very fine pitch screw rotated through several revolutions is avoided, it being a very difficult and expensive operation to cut screws of fine pitch without variations in pitch between the different turns.

If now the continuous dial is returned to zero and a spacer block having a thickness of .010 inch is inserted between the lever and push rod, the iron core will be displaced rearwardly by an amount sufficient to again tune the circuit to 101 megacycles, a second dial graduated in megacycles and having the notation 101 being associated with the spacer block to indicate that it is in position. The spacer block has a floating mounting so that it may move rearwardly with the iron core so that if the continuous dial is now rotated 1 division, the iron core will be displaced another .0001 inch rearwardly and the circuit will be tuned to 101,010 kc., this tuning being indicated by adding the reading 10 on the continuous dial to the reading 101 (times 1,000) appearing on the second dial. For each additional division of rotation of the continuous dial the circuit is tuned to another station, the resonant frequency being indicated for each position of the continuous dial by adding its reading to that of the second dial.

After the highest frequency of 102 megacycles has been reached with the first spacer block in position, by returning the continuous dial to 0 and replacing the first spacer block by a second one having a thickness of .020 inch, the circuit will again be tuned to 102 megacycles as indicated by numeral 102 on the second dial, which dial is mechanically connected to all the spacer blocks. By now rotating the continuous dial through 1 division, the circuit will be tuned to 102,010 kc. as indicated by adding the readings of the two dials. Further rotation of the continuous dial will tune the circuit to successively higher frequencies until the frequency of 103 megacycles is reached. With each spacer block in position the receiver may thus be tuned through 100 stations and it is a main feature of the invention that a whole series of such spacer blocks is provided in the form of a stepped floating cam which is rotatably mounted so that any desired spacer block may be quickly interposed between the lever and the end of the push rod.

It is a further important feature of the invention that provision is made for adjusting the thickness of each spacer block so that each step of the stepped cam may be made exactly .010 inch thicker than the next step. In the illustrated embodiment of the invention, each step of the cam is provided with an adjusting screw so that the thickness of each step may be readily and precisely adjusted to the desired value.

Another important object of the invention is the provision of such a stepped cam in which a hard wearing surface is provided on each step at the region where it engages the push rod. Such a wearing surface may be provided at a very small cost by means of a hard metal ball firmly secured in each step portion and in position to engage the end of the push rod. By providing a transverse groove in the end of the push rod so that it engages each ball at two spaced points on the curved surface of the ball and by biasing the push rod against the ball by means of a spring, a good detent action is secured which assists in setting each ball in proper position against the push rod. Furthermore, the wear does not all take place at the high point of each ball's surface as would be the case if the end of the push rod were flat and rested against the end or high points only of the balls.

The invention is heretofore described for use in adjusting a driven member in the form of a tuning element of a resonant circuit but its use is not so restricted. It is a further object of the invention to provide a gage device in which two adjusting units of the type heretofore described are mounted together to form a "go—no go" gage for the purpose of testing the sizes of a plurality of similar articles to insure that each comes within an allowable tolerance. Such a gage has a large field of utility in cases where only a relatively small number of articles are to be tested and yet where the tolerance limits are small so that a high degree of precision in measurement is required.

Further objects of the invention will become apparent as the description thereof proceeds. For a better understanding of the invention, reference is made to the following description taken in connection with the accompanying drawings, in which:

Fig. 2 is a fragmentary front view showing on an enlarged scale a portion of the front panel and the indicating dials of the radio receiver of Fig. 1;

Fig. 3 is a fragmentary horizontal sectional view showing the operating lever and a portion of the adjusting screw;

Fig. 4 is a vertical sectional view taken on the line 4—4 of Fig. 5 showing the adjusting screw mounting and the operating lever;

Fig. 7 is a side view, partly in section, showing on an enlarged scale a portion of the radio receiver of Fig. 1;

Fig. 8 is a sectional view taken on the line 8—8 of Fig. 5 showing portions of the adjusting screw and dial mountings;

Fig. 9 is a fragmentary vertical sectional view showing the supporting nut for the adjusting screw;

Fig. 10 is a vertical sectional view taken on the line 10—10 of Fig. 1 showing on an enlarged scale the construction of the coil, condenser and their supporting structure of the radio receiver of Fig. 1;

Fig. 11 is a rear view, partly in section, showing on an enlarged scale the construction of the floating cam of the receiver and a portion of its driving gear;

Fig. 12 is a vertical sectional view taken on the line 12—12 of Fig. 5 showing on an enlarged scale the operating lever, floating cam and the end portion of the push rod of the receiver tuning means;

Fig. 13 is a front view taken from the left of Fig. 14 showing on an enlarged scale the construction of the floating cam;

Fig. 14 is a vertical sectional view taken on the line 14—14 of Fig. 13 showing the construction of the floating cam and its operating lever;

Fig. 14a is a fragmentary vertical sectional view showing on a reduced scale a modified form of cam construction, the rear face of the cam being partly broken away;

Fig. 15 is a front view, partly in section, showing a tool comprising a plunger press adapted for forcing the balls of the floating cam into their proper positions;

Fig. 16 is an end view taken from the left of Fig. 15 showing on a reduced scale the supporting plate and the pins which engage the balls of the floating cam for forcing them into position;

Figs. 17 to 20 show on an enlarged scale a portion of the floating cam and the operation of seating a ball therein, and Fig. 21 is a side view showing a gaging device embodying the invention.

Figure 1:
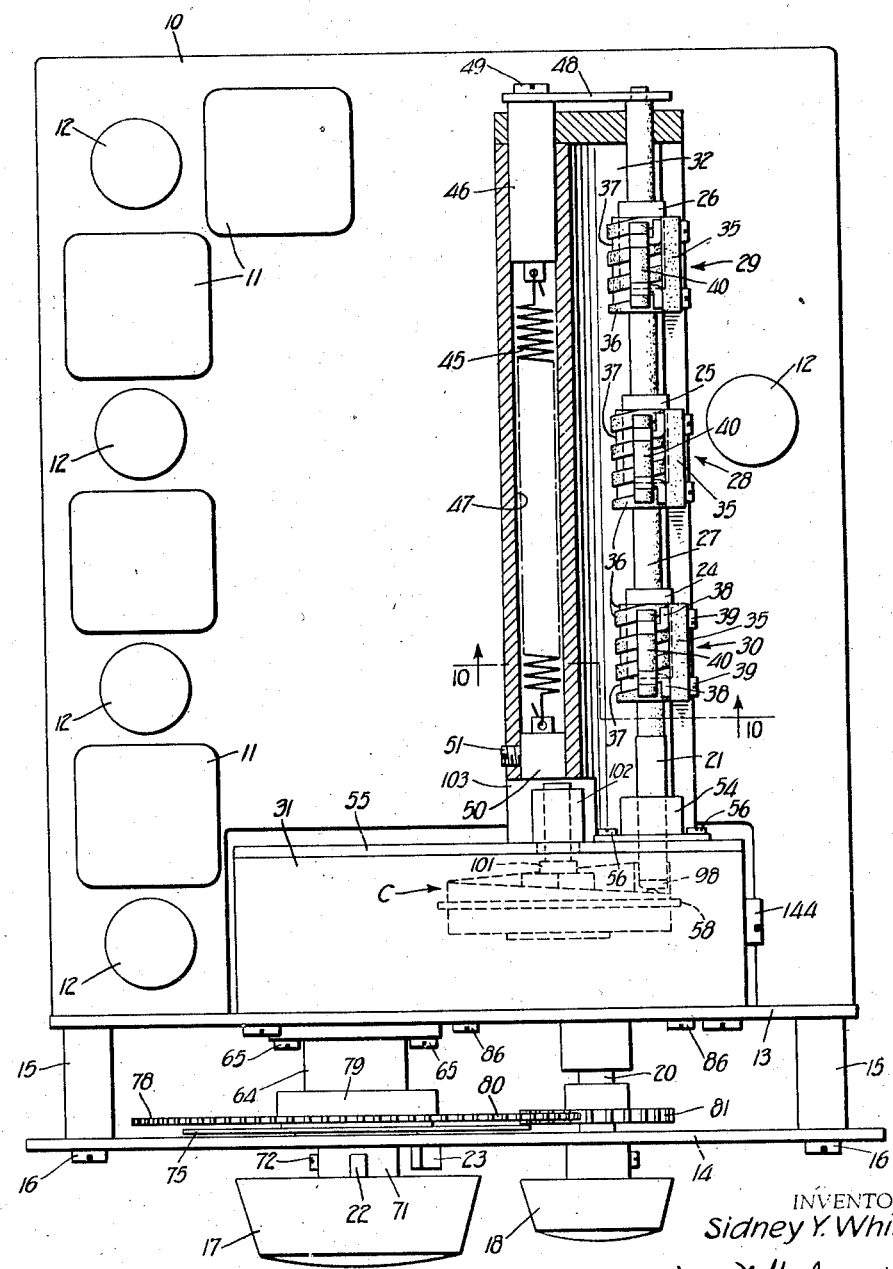
Fig. 1 is a top plan view showing the chassis and certain parts of a radio receiver embodying the invention.

Referring to Fig. 1 the invention is shown in connection with a radio receiver of the superheterodyne type for receiving ultra-high frequency radio signals and adapted to be energized by dry batteries. The receiver is especially adapted for mobile use where it may be subjected to shocks and jars caused by rough handling and to extreme changes in temperature and humidity, the receiver being constructed so that such changes have no effect on its tuning. The chassis 10 of the receiver comprises a plurality of intermediate frequency transformer units 11 and a plurality of miniature vacuum tubes 12. The receiver is provided with an intermediate vertical panel 13 and a front panel 14 which is secured to the intermediate panel 13 by means of the tubular sleeves 15 and screws 16. A pair of tuning control knobs 17 and 18 are mounted in front of the panel 14, these knobs being secured to a pair of shafts 19 and 20 (see Fig. 5) which extend rearwardly and are adapted to operate a push rod 21 through connections to be hereinafter described. The knob 17 carries a stop pin 22 which is adapted to engage an elongated abutment 23 secured to the panel 14 for the purpose of preventing the rotation of the knob 17 through a full 360 degrees.

Movement of the push rod 21 effects the tuning of the receiver by means of three compressed powdered iron cores 24, 25 and 26 which are secured to a rear section 27 of the rod 21, which section is composed of insulation material. The cores 25 and 26 tune the resonant circuits 28 and 29 to the frequency of the received carrier, and these circuits may, for example, be the grid circuits of the first R. F. amplifier stage and the first detector while the core 24 tunes the tank circuit 30 of the oscillator to a frequency differing from the carrier frequency by a desired intermediate frequency as, for example, 5 megacycles. The mechanical features of the circuits 28, 29 and 30 are similar and are illustrated in Figs. 1 and 10 in connection with the circuit 30. Secured to the panel 13 is a closed casing 31 which is provided with a rearwardly extending die casting 32 of generally U shape whose extending top and bottom walls 33—34 serve to firmly clamp in position a rectangularly shaped block 35 of ceramic insulation material. This block has fused thereto a thin cylindrical tube 36 of ceramic material which has a helical groove formed in its surface in which the turns of the coil 37 are wound, the coil preferably being of silver ribbon. The ends of the coil are soldered to a pair of silver blocks 38 which are secured in position on the block 35 by the screws 39 which also serve as the terminals of the resonant circuit. The blocks 38 also support the condenser 40 of the resonant circuit, the condenser terminals being soldered directly to the blocks. Also mounted on each block 35 for a purpose to be later described is a compressed powdered iron block 41 (Fig. 10) shown as having an arcuate upper face 42. The block 41 is adjustably secured in position on the block 35 by one or more screws 43 each passing through a narrow vertical slot 44 provided in the block 35. The rod 21 is biased forwardly with a force preferably of a pound or more by means of a spring 45 (Fig. 1) whose rear end is connected to a plunger 46 slidable in a cylindrical bore 47 formed in the casting 32, the plunger 46 having readily separable connection with the end 27 of the rod 21 by a bar 48 which is secured to the end of rod 46 by a screw 49. The tension of spring 45 may be regulated by means of a rod 50 to which the front end of the spring is connected and which is clamped in position in the bore 47 by a screw 51. To prevent rotation of the rod 21 during its longitudinal adjustment, it is provided along its top portion near its front end with a groove 52 (see Figs. 5 and 7) in which a ball 53 is seated, the ball being carried by a bushing 54. The bushing 54 is secured to the rear wall 55 of the casing 31 by screws 56 and serves to support and guide the rod 21 during its longitudinal adjustment.

Referring to Figs. 1, 5, 6 and 7 the front end of rod 21 engages a floating cam C which is mounted for both rotation and longitudinal movement, the cam being rotated by means of a gear wheel 57 secured to the shaft 20, this gear engaging a toothed gear 58 carried by the peripheral face of the cam C. Rotation of the cam C by the knob 18 and gear 57 serves to rapidly tune the resonant circuits 28 and 29 through a large number of stations in a manner to be later described. The cam C is also adapted to be moved bodily in a rearward direction to tune the circuits 28 and 29 through one or more stations by means of a lever L which is pivoted near its right end on a pin 59. An intermediate point on the lever carries a ball 60 which bears against the front face of cam C and the left end of the lever is moved rearwardly by means of a coarse pitch screw 61 formed on the shaft 19.

Figure 5:
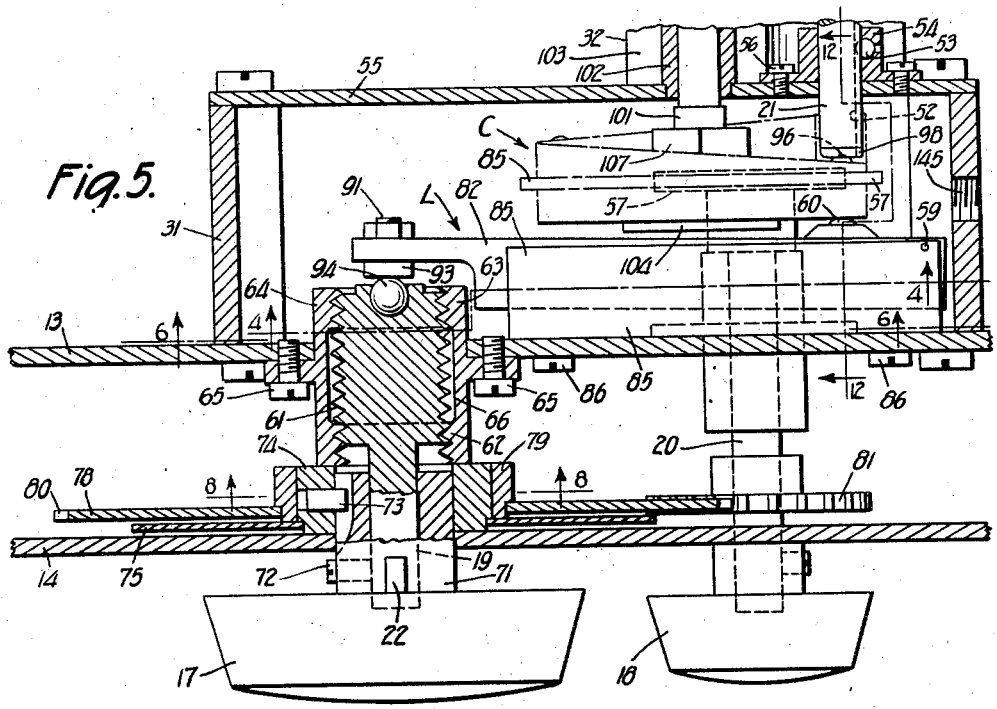
Fig. 5 is a plan view partly in section showing portions of the tuning adjusting device of the radio receiver shown in Fig. 1.
Figure 6:
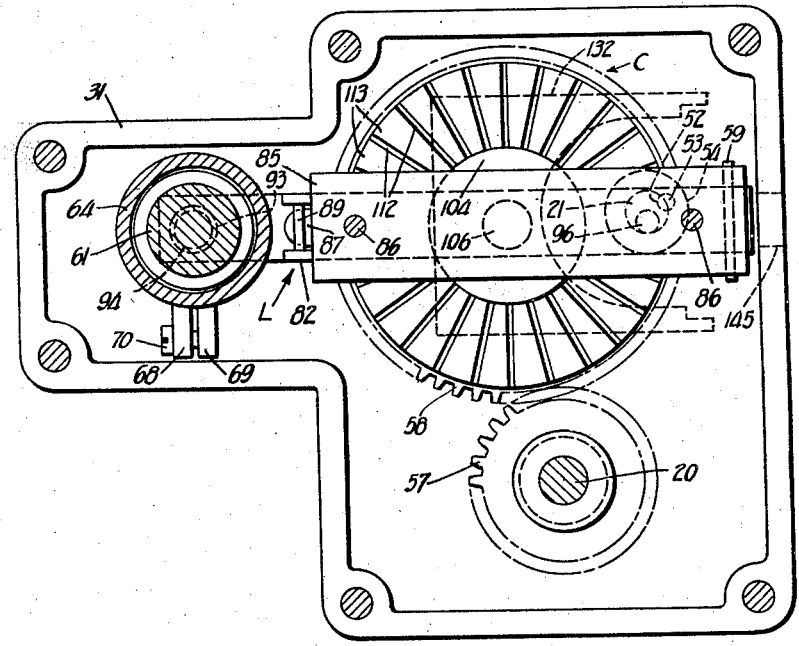
Fig. 6 is a vertical sectional view taken on the line 6—6 of Fig. 5 showing portions of the tuning adjusting device.

A detail description of the screw 61 and the means for indicating its position of adjustment will first be given. Referring to Figs. 5, 8 and 9, the threads of the screw 61 engage corresponding and spaced apart threaded portions 62—63 formed on the interior of a supporting nut 64 which is secured to the panel 13 by the screws 65. The central portion of the nut 64 is cut away, as indicated at 66, to clear the screw 61 and is also transversely slotted, as indicated at 67, to make the end portions of the nut more flexible. The front and rear ends of the nut are longitudinally slotted and provided with spaced downwardly extending arms 68, 69 which are adapted to be drawn toward each other by the screws 70, see Figs. 4 and 9. By supporting the screw 61 near its ends, vertical or sidewise motion thereof which might move the lever L slightly is prevented and by adjustment of the screws 70, firm engagement of the threads on the end portions 62—63 of nut 64 with the threads of adjusting screw 61 is assured, it being possible by means of this construction to take up any small amount of looseness or backlash which might exist.

As shown in Figs. 1 and 5, the knob 17 has an integrally formed sleeve portion 71 which is secured to shaft 19 by a screw 72, the sleeve being slotted to receive a pin 73 carried by a collar 74, see Fig. 8 also, which therefore rotates with the knob 17. At its front end the collar 74 has secured thereto a thin circular dial 75 which has 100 graduation divisions which extend through 270 degrees, as shown in Fig. 2. The dial reading appears in a window opening 76 in panel 14 which is provided with index marks 77 and, in the illustrated embodiment of the invention, each division of dial 75 represents 10 kc. Mounted behind and concentric with the dial 75 is a second dial 78 which is secured to a collar 79 rotatable on the collar 74. The graduations on the dial 78 are spaced apart by a substantial distance, as shown in Fig. 2, and also appear in the window opening 76, each graduation representing 1,000 kc. For rotating the dial 78 its periphery is provided with gear teeth 80 which engage and are driven by the teeth of a gear 81 secured to the shaft 20, see Figs. 2, 5 and 7. In order to prevent the rotation of the dial 78 through a complete revolution, a stop pin 79a projects from the rear face of the collar 79, see Figs. 7 and 8, this pin being adapted to strike against the screw 70 when dial 78 is rotated in one direction and against the depending arm 69 of nut 64 when the dial is rotated in the opposite direction.

Referring to Figs. 3, 4 and 5, the lever L comprises a generally channel shaped pivoted member 82 whose right-hand end is solid as shown in Fig. 3, the pivot pin 59 passing through the solid portion and also through the upper and lower side walls 83, 84 of a channel shaped supporting bracket 85 whose front wall is secured to the panel 13 by the screws 86. The pivot pin 59 is a tight fit for the holes in the pivoted member 82 and the upper and lower channel walls 83—84 to prevent any lost motion in pivoted member 82 as it oscillates. The center portion of the pivoted member 82 is cut away slightly so as to clear the upper and lower walls 83—84 but the end portions of these walls engage the upper and lower walls of the pivoted member 82 at all times thereby preventing any lost motion in an upward or downward direction of the pivoted member 82 about its pivot pin. The pivoted member 82 is constantly biased toward the adjusting screw 61 by means of an elongated flat spring 87 which is bent into the form shown in Fig. 3 and whose right-hand end is secured to the base of the channel bracket 85 by the screws 88 and thin plate 88a. The other end of the spring bears upon a pin 89 which extends between the upper and lower walls 90 of the channel member 82. Near its right-hand end the channel member 82 carries the ball 60 which engages the cam C while near its left-hand end it is provided with a bore adapted to receive a threaded screw 91 provided with a lock nut 92. The head of screw 91 is formed as a steel button 93 whose front surface bears against a steel ball 94 which is partly embedded in the end of the screw 61. To prevent wear of the button 93 its front face is preferably polished and lapped and hard chrome plated. The pitch of the screw 61 and the proportions of the arms of the lever L are such that when the knob 17 is rotated from the graduation zero to the graduation 1,000 on dial 75, the ball 60 will move the cam C and the push rod 21 rearwardly a distance of exactly .010 inch.

Referring to Figs. 11 to 14 for a detail description of the cam C, this is shown as comprising a generally disc shaped cam member 95 whose rear face is provided with 26 steps of increasing thickness, a steel ball 96 being secured in each step in a manner to be later described. The cam disc 95 is preferably formed as a die casting of an alloy consisting of 90% aluminum, 4% copper and 6% silicon. This alloy is readily adapted to the die casting process and is at the same time very tough, durable and corrosion resistant. The balls 96 are of the same diameter and are disposed at the same radius from the center of rotation of the cam disc 95. The bearing face of each ball is disposed at an elevation of exactly .010 inch from that of the next adjacent ball and the balls are adapted to come successively into engagement with spaced apart points 97 of a button 98 formed of carboloy and which is brazed to the end of the push rod 21. The spaced bearing points 97 are provided by cutting a horizontal V-shaped groove 99 in the end of the button 98, which construction results in most of the abrasion and wear on each ball 96, occurring at the high point of the ball which is not a gaging point, the amount of abrasion and wear on the gaging points of the ball being relatively small. The provision of the groove 99 also eliminates minor errors which might otherwise be caused by small variations in the radius of the balls 96 from the center of the cam disc 95. The construction also provides a good detent action, since if the cam disc 95 is not manually adjusted to exactly the correct position, that bearing point 97 which is in engagement with the sloping surface of a ball 96 will ride down such surface under the bias of the spring 45 thereby exerting a camming action on the cam disc 95 which rotates it a slight amount into the correct position. In such position both the bearing points 97 are in engagement with the surface of the ball, as shown in Fig. 12.

The upper face of the button 98 is ground to an arcuate shape as indicated at 100 to provide a better camming action as the next succeeding ball cames into engagement with and slides along such surface during the movement of the push rod rearwardly, thus facilitating the adjustment of the rod 21. The lower face of the button is rounded off slightly, as indicated at 100a, for a similar reason.

The cam disc 95 is secured to the front end of shaft 101 whose rear end is mounted for both rotation and longitudinal movement in a bearing 102 which is secured to the casing wall 55 and which extends into an opening 103 provided in the casting 32, see Fig. 14. The front end of the shaft 101 is formed as a large cylindrical disc 104 whose rear surface is undercut as indicated at 105, Fig. 14. An intermediate portion of the shaft 101 is threaded as at 106 and a cooperating lock nut 107 is provided. The front face of the cam disc 95 is also undercut at 108 to provide a peripheral face 109 which comes opposite the peripheral face 110 of disc 104. Mounted between the disc 104 and cam disc 95 is a thin steel disc 111 whose center portion is solid and whose outer portion is provided with a plurality of radial slits 112 which extend from just within the border of the peripheral faces 109—110 clear to the outer edge of the disc 111 thereby providing a plurality of bendable leaves 113 one of which comes opposite each of the balls 96. Before assembly the steel disc 111 is hardened and the center portion thereof is then annealed to render the material in the central region somewhat flexible so that each leaf 113 may be bent slightly independent of the other leaves, the material throughout the major portion of the leaves remaining hard, however. Cast in the front face of the cam disc 95 opposite each of the balls 96 is a groove the lower portion of which is semi-cylindrical as indicated at 114 (Fig. 13) and whose outer portion is tapered in the shape of a cone as indicated at 115 and having the same taper as the head of an adjusting screw 116. This screw is preferably provided with a hard screw-threaded portion 117 adapted to cut its own threads in the groove 114 and the outer end of the screw is rounded off slightly, as indicated at 116a, so as to prevent the end of the screw from cutting into the metal of cam disc 95.

Referring to Figs. 12 and 14, it will be obvious that the distance between the bearing surface of the ball 60 on lever L and the bearing surface of each of the balls 96 of cam C may be adjusted by a slight amount by rotating the screws 116. From Figures 6, 12 and 14 it will be observed that the lever L extends horizontally across the center line of shaft 101 so that the slight sidewise movement of the ball 60 caused by the oscillation of the lever exerts only a radial component of force on the disc 111 so that the oscillation of lever L has no tendency to rotate the cam disc 95 which would in turn displace the push rod 21 by a very small amount but, nevertheless, into an incorrect position.

The manner in which the balls 96 are secured to the cam disc 95 is shown in connection with Figs. 15 to 20 in which a plunger press P is shown as having a plunger or ram 119 mounted for reciprocation in the head 120 of the press provided with the cylinder bore 121, to and from which liquid under pressure is adapted to be admitted and discharged through a pipe 122. The plunger 119 is provided with an elongated groove 123 adapted to receive a screw 124 which prevents any rotation of the plunger. The plunger is bored to receive the projecting end 125 of a centering pin 126 which is locked to the plunger by a screw 127. The centering pin 126 is adapted to receive an annular ring 128 bored to receive a plurality of pins 129, there being a pin provided for each of the balls 96 in the cam. Means is provided for establishing the correct angular position of the annular ring 128 on the plunger 119 for which purpose the ring is provided with a bore 130 adapted to receive the projecting end of a positioning pin 131 carried by the plunger 119. It will be understood that while each of the pins 129 is snugly fitted to the ring 128, nevertheless each pin may be individually removed from the ring if desired so that the end of each pin may be ground off to make the pin of exactly the correct length. The face 132 of the plunger 119 which engages the flat ends 133 of the pins 129 is accurately ground to form a flat surface. Secured to the foot 134 of the press by a pair of screws 135 are a pair of annular rings 136, 137 which are bored at their center to receive a supporting hub 138 which in turn carries a centering pin 139 adapted to center and support the cam disc 95 in the press. Both faces of the ring 136 are ground flat as are also the face 140a of the press foot 134 and the face 141a of the annular ring 137. The right-hand face of the ring 137 is provided with a plurality of tapered teeth 140 shaped and positioned to enter the conical tapered grooves 115 in the cam disc 95. The pins 129 are first made slightly longer than necessary then the flat end 133 of each pin is ground off until the pin is of the correct length.

In operating the press the operator places all the balls 96 in the openings 141 which have been cast in the cam disc 95 when it was formed, each of the openings 141 being provided with short straight parallel walls 142 in which the operator presses each ball 96 snugly into the position shown in Fig. 18. The operator then places the cam disc 95 on the centering pin 139 of the press so that the balls 96 come opposite the pins 129. Fluid under pressure is then admitted through pipe 122 into the cylinder bore 121 of the press whereupon the plunger is actuated to move the ends of the pins 129 into engagement with the balls 96 and force the balls against the bottom of the openings 141 into the position shown in Fig. 19. It will be noted in this figure that each pin is provided with a sharply tapered peripheral margin 143 which comes into engagement with the metal of cam disc 95. As the motion of the press plunger is continued to its extreme end position, the metal immediately under each ball 96 is compressed from the dotted line position 144 to the full line position shown in Fig. 20 and also the metal of cam 95 under each tapered tooth 140 is compressed from the dotted line position shown in this figure to the full line position shown therein, the amount of these compressions being shown exaggerated for the purpose of clearness. Simultaneously the tapered end portion 143 of each pin 129 is pressed into the metal of cam disc 95 and turns it over into firm engagement with the surface of the ball as shown in Fig. 20, thereby locking each ball in position on the face of the cam disc 95. The lengths of th pins 129 are made such that after the pressing operation, the bearing surface of each ball is at an elevation of .010 inch above that of the next adjacent ball. The plunger 119 is then returned to its initial position by withdrawing fluid out of the pipe 122 and the cam disc 95 with its attached balls 96 is placed in a heated oven where it is heated to a temperature slightly above 400° F. to relieve any internal strains which may have been set up in the metal of the cam disc. The operation of placing the balls in the openings 141 in cam disc 95 and of pressing the balls into the disc by the press P is carried on in an air conditioned room from which dust and dirt particles have been removed.

In using the tuning device the dial 78 is set at 125 and the dial 75 set at zero. The coils of the resonant circuits 28 and 29 are now individually adjusted lengthwise of the rod 21 by slightly spreading apart the upper and lower walls 33 and 34 of the casting 32, see Fig. 10, a special expanding tool (not shown) being provided for this purpose, whereupon the insulation blocks 35 are slid along the walls 33—34 until each of the circuits 28 and 29 is tuned to exactly 125 megacycles. The expanding tool is then removed whereupon each block 35 becomes firmly clamped in position by the walls of casting 32, it being found that this clamping action is adequate to prevent the blocks from moving thereafter even when the radio set is subjected to sudden shocks or excessive vibration. The expanding tool is now inserted between the walls 33—34 closely adjacent to the block 35 of oscillator circuit 30 and the oscillator coil 37 moved longitudinally with reference to its iron core 24 until the desired oscillator frequency is secured. The expanding tool is then removed and the block 35 of the oscillator circuit remains clamped in the proper position. The cam C and dial 78 are then rotated by the operator rotating the knob 18 in the direction opposite to that shown by the arrow in Fig. 2 until the outer dial reads 100 megacycles. The iron blocks 41, see Fig. 10, of the circuits 28 and 29 are then raised or lowered until each of these circuits is tuned to 100 megacycles whereupon the blocks are secured in fixed position by tightening the screws 43. The adjustment of these blocks has the effect of changing the slope of the tuning curve of these circuits. The iron block 41 of the oscillator circuit 30 is then adjusted in a similar manner to give the proper oscillator frequency. After such adjustments of the circuits to the indicated frequencies, rotation of the knob 17 in the clockwise direction for a distance of one division on dial 75 causes the rotation of the screw 61 and movement of the pivoted lever 82 rearwardly, the ball 60 moving the push rod 21 and its attached cores 24, 25 and 26 rearwardly a distance of .0001 inch thereby tuning the circuits 28 and 29 to a frequency of 100,010 kc. as determined by taking the sum of the reading on dial 78 and that on dial 75. This adjustment of the knob 17 has thus tuned the receiver to the next adjacent station. The knob 17 is now rotated another dial division of dial 75 whereupon the indicated frequency reading is 100,020 kc., as determined by adding together the two dial readings. This rotation causes the lever 82 and ball 60, Figs. 2 and 3, to be moved rearwardly so that the iron cores 24, 25 and 26 are moved rearwardly another .0001 inch at which time the circuits 28 and 29 are tuned to the frequency of the next succeeding station. When the knob 17 has thus been rotated through 100 dial divisions of dial 75, the circuits 28 and 29 will be tuned to 101 megacycles and the iron cores 24, 25 and 26 will have been adjusted .010 inch rearwardly of their initial positions. By now returning the knob 17 and dial 75 to their initial or zero positions, the rod 21 will be returned to its initial position under the bias of the spring 45. By now rotating the dial 18 in the direction shown by the arrow in Fig. 2, until the outer dial 78 reads 101 megacycles, the cam disc 95 is rotated until the next higher ball 96 thereon comes into engagement with the bearing points 97 on the button 98, see Figs. 2 and 12. The advancement of this ball cams the push rod 21 rearwardly a distance of .010 inch and tunes the circuits 28 and 29 to the indicated dial reading of 101 megacycles. Any slight inaccuracy of the tuning to this frequency may be compensated for by the operator withdrawing a screw 144 from a threaded aperture 145 in the casing 31, see Figs. 1 and 7, and adjusting the aligned screw 116 in the cam disc 95 to move the cam disc 95 and the push rod 21 either forwardly or rearwardly a slight amount until the circuits are tuned to the desired frequency.

The receiver may now be tuned consecutively through the next 100 stations by rotating the knob 17 and dial 75 consecutively through 100 divisions of the dial 75 until this dial reads 1,000 when the circuits 28 and 29 will be tuned to 102 megacycles and the push rod 21 will be .020 inch rearwardly of its initial position. By now rotating the knob 17 until the dial 75 reads zero and then rotating the knob 18 and the dial 78 until the dial reading of 102 megacycles appears on this dial, the third ball 96 on the cam 95 will have been brought into engagement with the bearing points 97 on the button 98 and the circuits 28 and 29 will be again tuned to 102 megacycles. Any slight inaccuracy of the tuning for this dial position may be corrected in the manner above described by adjusting the appropriate adjusting screw 116. By continuing this operation repeatedly, the receiver may be tuned through the entire 2,500 stations and the tuning of the circuits 28 and 29 lined up and adjusted to a desired value for each of the divisions on the outer dial 78 by means of the adjusting screws 116 in the manner heretofore described. It will be understood that after all these screws have been appropriately adjusted that the screw 144 will be again screwed into the threaded opening 145, Figs. 1 and 7, thereby sealing the cam C, lever L, and their associated parts in the casing 31 against the entrance of dust or dirt particles which might otherwise collect on different parts of the mechanism and destroy its accuracy by interfering with its proper operation. The receiver is then ready for operation and it is found that within the short interval of 4 seconds it may be tuned from any station to any other of the 2,500 stations.

The oscillator circuit 30 is appropriately tuned through its proper range by designing its iron core 24 of slightly greater diameter than the cores 25 and 26 of the circuits 28 and 29. From the above description it will be observed that when the cores 24, 25 and 26 are made of compressed powdered iron the frequency of their circuits increases as the cores move out of the coils of the respective circuits. By making these cores, however, of solid copper the resonant frequency of the circuits can be made to decrease as the copper cores move out of the coils of the several circuits. If copper cores are used, the block 41, Fig. 10, is also preferably made of copper.

Where the receiver is adapted for tuning to lower frequencies, as, for example, in the range of 3 to 15 megacycles, in certain cases adjustment of the thickness of cam C at each of the steps thereon may not be required. In such cases the more simple and less expensive form of construction illustrated in Fig. 14a may be employed. In this form, a groove is cast in the front face of the cam 95a at the time the cam is die cast and a hardened and polished steel ring 114a is pressed into this groove with a force fit at the same time the balls 96 are pressed into position in the die casting. It will be understood that the ring 114a is positioned for engagement by the ball 60 of lever L and provides a hard surface to take up the thrust of the lever, thereby preventing the wearing away of the front face of the cam which would otherwise occur.

All the balls used in the tuning device are preferably made of polished steel which has been nitrided to harden them and render them corrosion resistant. All the bushings which support the rotary shafts as well as the threaded nut 64 and the hub 54 which supports the push rod 21 are preferably made of bronze. The remaining members of the tuning device (except those above specified as being of different materials) are preferably made of duralumin or other metal which is highly resistant to corrosion as, for example, stainless steel, bronze or Monel metal.

The invention is shown in Fig. 21 in connection with a gage of the "go—no go" type such gages being used to test the sizes of similar articles which must come within a certain allowable tolerance. In connection with such gages, the invention is of decided advantage where only a relatively few parts as, for example, 30 to 200 or more are to be tested and their number would not warrant the expense of building a special, non-adjustable gage for the purpose. The measuring surfaces of the gage being readily adjustable, it may be quickly set up to allow for any desired tolerance in the size of the articles under test. In the gage shown (Fig. 21) upper and lower adjusting devices are shown, each device being of the same general construction as that above described and corresponding parts being designated by the same reference characters primed and double primed. The cams and driving gearing of both devices are housed in a common casing 31' which is attached to a pair of lugs 146 on a supporting base 147 by screws 148. In alignment with the push rods 21' and 21'' are a pair of screws 149, 150 which are threaded into apertures in a rear supporting standard 151 which is in turn secured to the supporting base 147 by the screws 152. Suitable lock nuts 153, 154 are provided for locking the screws 149 and 150 in desired positions.

Instead of operating tuning elements as in Fig. 1, the push rods 21', 21'' operate the adjustable gage blocks 155, 156 which are disposed opposite a similar pair of gage blocks 157 and 158. The gage blocks 155 to 158 are made of hard material as, for example, carboloy, some hard steel, hard chrome plated or nitrided steel and the opposed faces of each pair are ground flat and polished. In this form of the invention the long spiral spring 45 of Fig. 1 is replaced by a shorter spiral spring 159 of continually increasing radius, as shown, the small end of the spring engaging a disc 160 secured to the push rod 21'. The large end of each spring 159 is anchored against the rear wall of the plate 55' by means of a generally conical shaped casing 161 which is secured to the plate 55' by the screws 162. Each casing 161 at its rear end is bored, as at 163, to form a supporting hub for the push rods 21' and 21''.

In this form of the invention the dials of both units are preferably graduated in inches or other unit of length and the numbering on the dials reversed from the arrangement shown in Fig. 2, both dials of each unit reading zero when the gage blocks 155—157 and 156—158 are in contact and the dial readings increasing as the space between the gage blocks is increased in response to the forward movement of the push rods 21'—21''. If the divisions on the outer dial 78' are, for example, 0, .010, .020, .030, etc., inch and the inner dial 75' is graduated so that each division = .0001 inch, then the spacing between the gage blocks 155 and 157 may be readily determined by merely adding together the readings of the two dials. For example, if the outer dial reads .010 and the reading on the inner dial is 5, then the distance between the gage blocks is .010 + .0005 = .0105 inch. It will be understood that distances closer than .0001 inch may be approximated by setting the inner dial 75' between two dial divisions, it being readily possible to interpolate by the eye to within one fifth of a dial division. In using the device as a "go—no go" gage, the knob 17' or both the knobs 17' and 18' are rotated until the spacing between the gage blocks 155 and 157 is the same as the maximum allowable size of the article under test. The knob 17'' or both the knobs 17'' and 18'' are then rotated until the spacing between the gage blocks 156 and 158 corresponds to the minimum tolerance limit in the size of the article. Each article under test is then passed down between the gage blocks of the two units. If the article fails to enter and pass between the blocks 155 and 157, it is too large and is rejected. If the article passes between the gage blocks 155 and 157 and also passes between the blocks 156 and 158 it is rejected as being too small. It is a distinct advantage of the device that it may be quickly set for testing articles of any size within its scope of adjustment. Furthermore, any wearing away of the surfaces of the gage blocks may be readily compensated for by adjusting the screws 149 and 150.

While I have illustrated my invention as including a stepped cam as a spacing means for effecting different positions for the operated rod or member 27, each of which cam steps as described differs uniformly in thickness from a preceding one of said cam steps, it will be understood that for some purposes these cam portions may have any desired different thicknesses to meet the requirements of different purposes of use, whether the limited amount of movement of the lever or operating member L is equal to the difference between successive thicknesses or not. It will further be understood that my invention is adapted for use where lesser degrees of accuracy of movement are permissible than for the uses described; for example, for the purpose of the relatively general grading or grouping of objects as to size, or the resonant selection of radio stations from a relatively small group of stations such as the broadcast band, the high degree of accuracy described may not be required; in such cases the spacing means or cam C need not be provided with the balls 96, but may be an integral structure made from a single metal block, with a degree of accuracy in any case, that is commensurate with the intended purpose of the structure.

I have described what I believe to be the best embodiments of my invention. I do not wish, however, to be confined to the embodiments set forth, but what I desire to cover by Letters Patent is set forth in the appended claims.

I claim:

1. A cam disc having an end face thereof provided with a series of permanently and immovably embedded, hard balls which are spaced apart by substantially equal distances and disposed at successively increasing elevations, the increment in elevation between successive balls being substantially from the first through the last of the entire series, and a contact member and micrometric adjusting means therefor provided in alignment with each of the balls for regulating the thickness of the cam at a plurality of regions thereof.

2. A cam having the rear end face thereof provided with a plurality of balls which are spaced apart by substantially equal distances and disposed at successively increasing elevations with the increment in elevation between successive balls being substantially constant, a thin disc disposed alongside the front face of the cam and provided with a plurality of separate bendable radially extending leaves disposed directly opposite the said balls and radially adjustable means disposed between the front face of the cam and each of said bendable leaves adapted to bend the leaves individually by desired amounts.

3. A cam disc of relatively soft material having an end face thereof provided with a series of balls of relatively hard metal spaced from one another circumferentially of the disc, said balls being permanently and immovably embedded in the relatively soft disc material and protruding beyond the end face thereof, and disposed at successively increasing elevations from the first through the last of the entire series, the increments in elevation between successive balls being of accurately determined magnitude, and a contact member and micrometric adjusting means therefor provided in alignment with each of the balls for regulating the thickness of the cam at a plurality of regions thereof.

4. A spacing cam disc having a multiplicity of successive sectors of progressively increasing thickness adapted to be turned into an effective position one after the other by rotation of the cam, each sector including bi-directional thickness adjusting means whereby its thickness may be precisely increased or diminished independently of adjacent sectors and fixed to provide an individually characteristic thickness of predetermined magnitude.

SIDNEY Y. WHITE.